(12) United States Patent  (10) Patent No.: US 9,795,003 B2
Johnson  (45) Date of Patent: Oct. 17, 2017

(54) PROGRAMMING MODULE FOR LUMINAIRE

(71) Applicant: GE Lighting Solutions, LLC, East Cleveland, OH (US)

(72) Inventor: David Mark Johnson, East Flat Rock, NC (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 14/925,186

(22) Filed: Oct. 28, 2015

(65) Prior Publication Data

US 2017/0127494 A1  May 4, 2017

(51) Int. Cl.
H05B 37/02 (2006.01)
H05B 33/08 (2006.01)
G06K 1/12 (2006.01)

(52) U.S. Cl.
CPC ......... H05B 37/0218 (2013.01); G06K 1/121 (2013.01); H05B 33/0845 (2013.01); H05B 37/0272 (2013.01)

(58) Field of Classification Search
CPC . G01R 1/121; H05B 33/0845; H05B 37/0272
USPC ........................................................ 315/307
See application file for complete search history.

(56) References Cited

U.S. PATENT DOCUMENTS

| 7,014,339 | B2 | 3/2006 | Sears, Jr. et al. | |
| 7,723,862 | B1 * | 5/2010 | Spillman | H05B 37/00 307/11 |
| 2002/0038392 | A1 * | 3/2002 | De La Huerga | A61M 5/14212 710/8 |
| 2004/0212324 | A1 * | 10/2004 | Callahan | H05B 37/02 315/312 |
| 2007/0057807 | A1 * | 3/2007 | Walters | G06Q 30/04 340/7.29 |
| 2012/0139426 | A1 | 6/2012 | Ilyes et al. | |
| 2013/0063032 | A1 * | 3/2013 | Nevins | H05B 37/0218 315/115 |

(Continued)

FOREIGN PATENT DOCUMENTS

| DE | WO 2013159833 A1 * | 10/2013 | ......... H05B 37/0218 |
| EP | 1734795 A1 | 12/2006 | |

(Continued)

OTHER PUBLICATIONS

International Search Report and Written Opinion issued in connection with corresponding PCT Application No. PCT/US2016/051863 dated Nov. 23, 2016.

*Primary Examiner* — Dylan White
(74) *Attorney, Agent, or Firm* — Peter T. DiMauro; GE Global Patent Operation

(57) ABSTRACT

There are provided methods and devices for programming a luminaire. For example, there is provided a programming module for use with a luminaire. The programming module includes a connector configured to provide an interface between the programming module and the luminaire via a photo-electric element (PE) socket of the luminaire. The programming module further includes a memory and a processor. When executing instructions included in the memory, the processor is configured to perform operations that include measuring the input power to the luminaire and changing a driver current set point.

20 Claims, 5 Drawing Sheets

(56) References Cited

U.S. PATENT DOCUMENTS

| | | | |
|---|---|---|---|
| 2013/0181609 A1* | 7/2013 | Agrawal | H05B 37/03 |
| | | | 315/131 |
| 2014/0062297 A1* | 3/2014 | Bora | H05B 33/0863 |
| | | | 315/34 |
| 2014/0302715 A1 | 10/2014 | Wagner et al. | |
| 2015/0097816 A1* | 4/2015 | Beklemisev | H04H 60/04 |
| | | | 345/184 |
| 2015/0160305 A1* | 6/2015 | Ilyes | G01R 31/44 |
| | | | 324/414 |
| 2015/0264776 A1 | 9/2015 | Amarin et al. | |

FOREIGN PATENT DOCUMENTS

| | | | | |
|---|---|---|---|---|
| EP | 2779652 A1 | 9/2014 | | |
| GB | EP 1734795 A1 * | 12/2006 | | H05B 37/0218 |

\* cited by examiner

100

102

104

FIG. 2
200
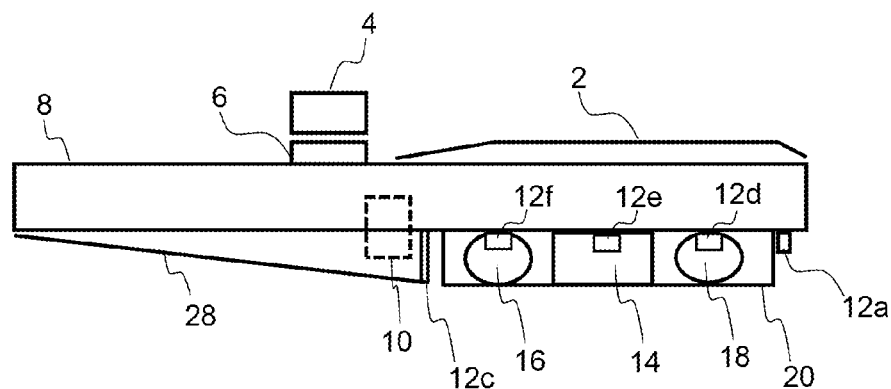
FIG. 3A      FIG. 3B      FIG. 3C
    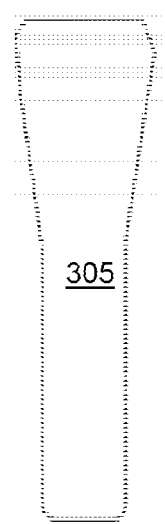    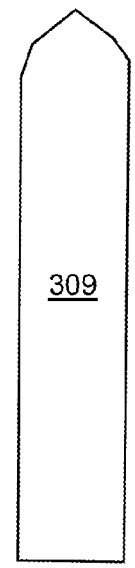

400

500

PROGRAMMING MODULE FOR LUMINAIRE

TECHNICAL FIELD

The present disclosure generally relates to luminaires. More particularly, the present disclosure relates to a programming module for a luminaire.

BACKGROUND

A typical luminaire includes a ballast circuit configured to control the light output of the luminaire. In luminaires that include light emitting diodes (LEDs), the ballast circuit can include a driver circuit configured to set a bias (or driver) current for one or more of the LEDs. This driver current can be programmed to a fixed level during manufacture, or it can be reprogrammed in the field by a technician. In the latter case, the luminaire may have to be opened so that the technician can gain access to the circuit to set a new bias current level (i.e. a new driver current set point). Alternatively, the technician may be equipped with a device capable of reprogramming the driver circuit when the device is in a certain proximity of the luminaire.

The current methods for programming the driver current mentioned above have several shortcomings. In the case where the technician manually reprograms the driver current, a significant amount of manpower is needed, which makes such an operation cost-prohibitive. In the case where a proximity device is used, the luminaire must be equipped with hardware that can support such a device, which increases the average cost of the luminaire.

SUMMARY

The embodiments featured herein help solve or mitigate the above-noted issues as well as other issues known in the art, in addition to providing new capabilities. Specifically, the exemplary embodiments provide a means for programming a driver current in a luminaire without the need for extensive efforts from a technician and without the need to equip the luminaire with components dedicated solely for proximity programming. Further, the embodiments make it possible to service old luminaires without the need to retrofit them to ensure compatibility with the presently disclosed technology.

Moreover, the embodiments allow different lumen levels to be programmed into a luminaire. For example, a programming module, according to one embodiment, may allow a technician reprogramming the luminaire to change the lumen output of the luminaire simply by changing the bias current level of light emitting diode (LED) banks included in the luminaire. The ability to easily change lumen output is needed since in typical industrial settings, luminaires may be manufactured with a standard bias current, which means a standard lumen output level. However, customers may require lumen outputs that are different from the standard lumen output level, based on how they will place the luminaires on a roadway or based on their budget, as lumen output levels correlate directly with power consumption. In some instances, the embodiments may serve to reprogram a unit to its factory settings.

Embodiments of the present invention afford customers the ability to perform late point identification and diagnostics of units that are deployed in the field. Herein, a late point identification and/or diagnostics can refer to in-field testing of a luminaire for key parameters, such as lumen output, bias current, total wattage of the system, reading of a part number (or SKU number, as is known in the art), or determining when a unit was last programmed. Here, the term "in-field" is used generally to mean any situation in which the luminaire has exited the manufacturing plant and is ready to be deployed or has already been deployed. As such, embodiments of the invention may allow a technician to reprogram a unit received in her office, right out of the box, in the back of a utility truck, or they may also allow her to reprogram a unit that is mounted on a street pole and has already been in service.

In one embodiment, there is provided a programming module for use with a luminaire. The programming module includes a connector configured to provide an interface between the programming module and the luminaire via a photo-electric element (PE) socket of the luminaire. The programming module further includes a memory and a processor. When executing instructions included in the memory, the processor is configured to perform operations that include measuring input power to the luminaire and changing a driver current set point.

In another embodiment, there is provided a method for programming a driver current for a light source of a luminaire. The method includes interfacing a programming module with the luminaire via a photo-electric element socket of the luminaire. Furthermore, the method can include performing, following the interfacing, at least one of measuring input power to the luminaire and changing a driver current set point using the programming module.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 2 is a side view of the luminaire of FIG. 1A.

FIGS. 3A-3C are illustrations of possible shapes of luminaires in which the invention may be practiced.

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1A:
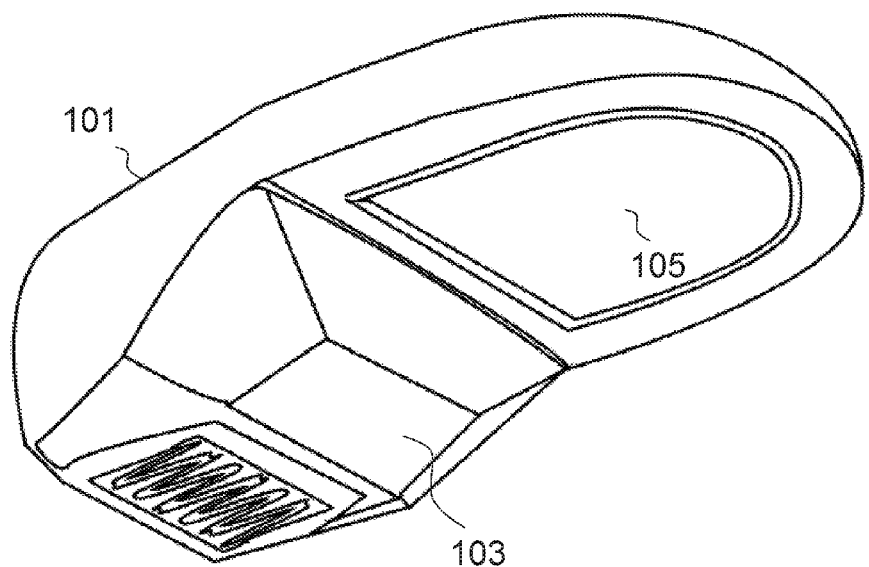
FIG. 1A is an illustration of a luminaire in which the invention may be practiced.

FIG. 1A is an illustration of a luminaire 100 according to an embodiment. Luminaire 100 can have a metallic body 101 having the shape of a cobra's head. It may also include a removable portion 103, which can be removed to provide access to the electronics contained inside the body 101 of luminaire 100. Removable portion 103 may include a hinge and a locking mechanism to allow it to remain affixed to body 101 and to provide an easy means of gaining access to the electronics. This can be done simply by unlocking the mechanism and pivoting portion 103. Alternatively, portion 103 can be secured to body 101 using screws or pins, or with any other similar means.

Luminaire 100 can further include a cavity (not shown) in which there is disposed one or more light sources. The light sources can be protected from the ambient environment by a transparent glass 105. The light sources can be LEDs, in some embodiments, or they can be high intensity discharge (HID) lamps in other embodiments.

Figure 1B:
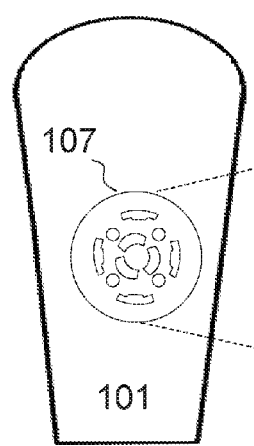
FIG. 1B is a top view of a luminaire in which the invention may be practiced.

FIG. 1B shows a top view of luminaire 100, according to an embodiment. On the dorsal portion of luminaire 100, there is disposed a socket 107. In typical luminaires, socket 107 is used exclusively for interfacing a driver circuit of the luminaire with a photo-sensor (PS) element or photo-electric (PE) element. In embodiments of the invention, however, socket 107 can be used for a module that is configured to read and write specific data, as will be explained in greater detail below.

Figure 1C:
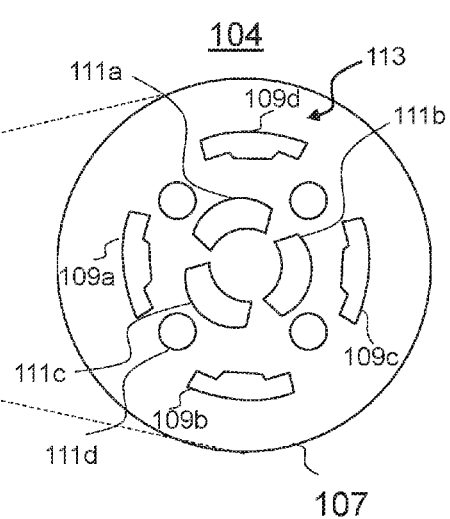
FIG. 1C is an extended view of a feature of the luminaire of FIG. 1B.

FIG. 1C shows an extended view of socket 107. Socket 107 includes structural features 113, which can physically hold a device that is to be connected to socket 107. Furthermore, the structural features 113 of the socket 107 can include metallic contacts for a plurality of leads (109a-109d and 111a-111d). In typical luminaires that use a PE connected to socket 107, two of leads 109a-109d are used to provide control signals for the PE element, and at least one other of the remaining two leads remain unused (the other lead can either be unused or it can be used as a ground wire).

FIG. 2 illustrates a side view 200 of luminaire 100, according to an exemplary embodiment. Luminaire 100 includes various optoelectronic components, such as LEDs 12f, 12e, and 12d, their respective reflectors 16, 14, and 18, and driver circuit 10, which drives the aforementioned LEDs with a pre-programmed driver current. Furthermore, luminaire 100 may include support members 12a and 28, which serve to secure the various structural components of luminaire 100. Luminaire 100 can include a driver circuit 10 for providing and regulating a drive current to the luminaire.

In some embodiments, a fin 2 may be disposed on a dorsal portion of body 101. Fin 2 may enhance heat dissipation properties of luminaire 100, the heat arising from operating the optoelectronic components included in luminaire 100. Fin 2 may include a plurality of grooves or corrugations designed to further enhance heat dissipation from luminaire 100. Furthermore, in some embodiments, fin 2 may be a feature that is machined within the dorsal portion of body 101. In alternate embodiments, fin 2 may be a discrete part that is affixed to the dorsal portion of body 101, using a thermally conductive adhesive, for example. In yet other exemplary embodiments, luminaire 100 may not include a fin at all.

As mentioned above, the dorsal portion of body 101 includes a socket 107 configured to receive and hold in place a photo-sensor (PS) element or photo-electric (PE) element 4. Socket 107 may be a PE socket that interfaces one or more components located within body 101 with PS element 4. PS element 4 may be an optoelectronic circuit configured to convert ambient light energy into an electrical current or a voltage signal. The electrical current or voltage signal may be further processed to generate a control signal indicative of the ambient light intensity, the intensity being indicative of daytime conditions or nighttime conditions.

The generated control signal may be used to turn on (activate) or turn off (deactivate) one or more light sources included in luminaire 100, depending on the ambient light intensity. In some embodiments, PS element 4 may be configured to gradually turn on one or more light sources included in luminaire 100 or gradually turn off the one or more light sources. PS element 4 may interface with driver circuit 10 in order to perform the aforementioned functions.

One of ordinary skill in the art will readily understand that PS element 4 may include any light-responsive sensor capable of transducing light into an electrical current or voltage. For example, PS element 4 may include a light-sensitive sensor that is at least one of a solar cell, a photodiode, a photo-gate sensor, and a photo-resistive material. Furthermore, in some exemplary embodiments, PS element 4 may include a timing circuit configured to turn on one or more light sources or to turn the one or more light sources off based on pre-determined time markers outputted by the timing circuit.

As depicted in FIGS. 3A-3C, the body 101 of luminaire 100 can have either a rectangle shape 303, a horn shape 305, or a bullet-shape 309, when viewed from the top. One of skill in the art will readily appreciate that body 101 can have other shapes without departing from the scope of the present disclosure. Furthermore, while FIGS. 1A-1C, 2, and 3A-3C relate only to outdoor pole-mounted luminaires, other types of luminaires, such as outdoor lamp-post luminaires or even indoor luminaires, can be used to practice the invention.

Figure 4:
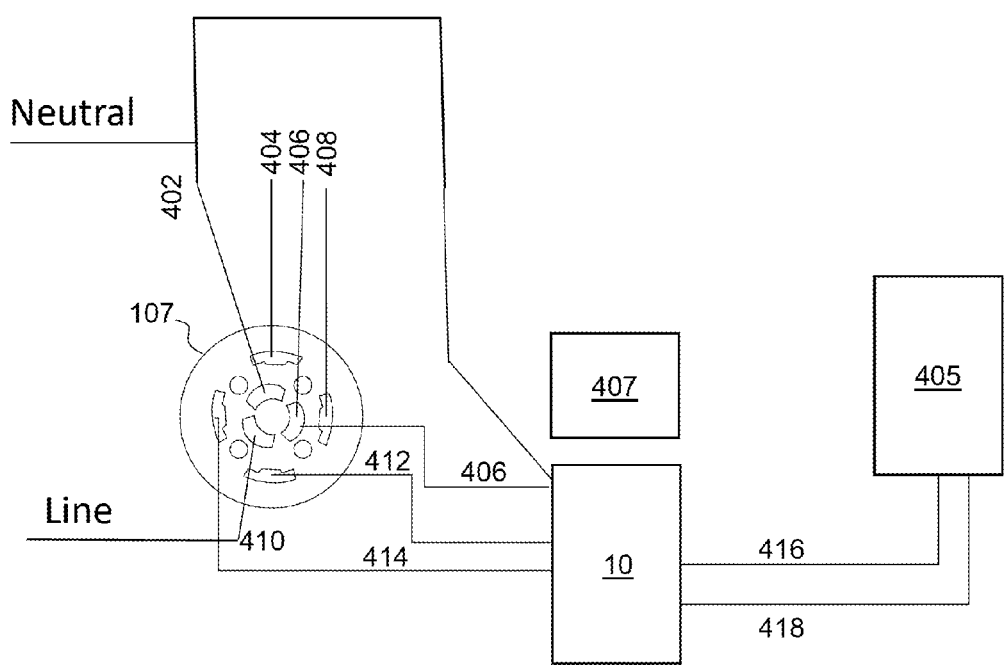
FIG. 4 is a block diagram, according to an embodiment.

FIG. 4 is a diagram 400 illustrating the electrical connections stemming from socket 107. As shown in FIG. 4, socket 107 may provide several leads (402, 404, 406, 408, 410, 412, and 414) that are used to interface with circuits and/or components located within luminaire 100. In typical luminaires, only two leads are used to provide dimming and ON/OFF control signals; these are leads 412 and 414. All the other leads, in the example shown, are either unused or are used to for other functions. Leads 412 and 414 are connected to driver circuit 10, which outputs driving signals 416 and 418 that in turn drive a board 405 that includes one or more LEDs, for example.

In a typical operation, i.e. when PS element 4 (as shown in FIG. 2) is attached to socket 107, leads 402 and 406 are used to power the driver circuit 10 to either turn on or off the LEDs on board 405, depending on which instruction is provided. Driver circuit 10 can also dim one or more LEDs based on the control signals 412 and 414. However, PS element 4 cannot monitor the current level at which the LEDs are driven, whether they are being dimmed or not, and nor can PS element 4 change the pre-programmed rate at which a current is changed to provide a dimming effect. Furthermore, PS element 4 cannot read or write information in the various memories (not shown) that may be included on circuit boards included in luminaire 100. Furthermore, in a typical operation, line 402 is a neutral terminal and line 410 is a line terminal that provides power to driver circuit 10. PS element 4 may be configured to turn ON the luminaire by connecting line 410 to 406. Moreover, PS element 4 may be configured to turn OFF the luminaire by opening the connection of 410 to 406.

Figure 5:
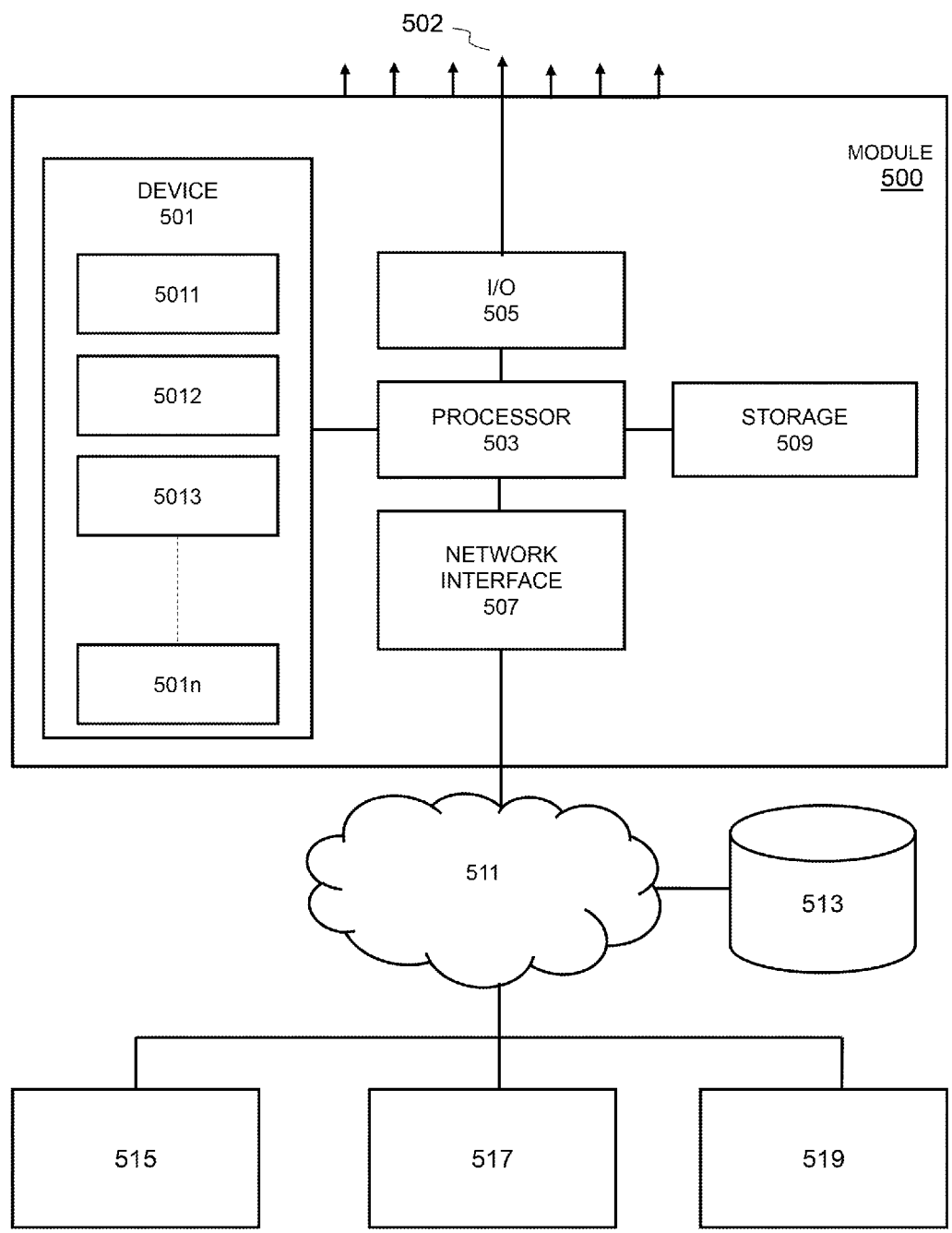
FIG. 5 is an illustration of a programming module, according to an embodiment.

In embodiments of the invention, a module 500, instead of PS element 4, can be attached to socket 107. The structure of module 500 is shown in FIG. 5. The module 500 includes a connector 502 adapted to fit into the PE socket 107 disposed on the dorsal portion of luminaire 100. Module 500 is a programming module, in that it can perform read and write operations to various memories that may be located within luminaire 100. As such, module 500 has functions that are different when compared to PS element 4.

Module 500 may include one or more hardware and/or software components configured to fetch, decode, execute, store, analyze, distribute, evaluate, and/or categorize information. Module 500 may be battery-powered or it may include a power supply specifically suited for drawing power from a powerline or from a power supply of the luminaire itself. In other embodiments, module 500 can be powered with a power cord connected to a conventional wall-mounted electrical outlet.

Module 500 may be configured to function as a client device communicatively coupled to a server (not shown) via network 511. The server may be located at a data center (not shown) or at one of the control stations 515, 517, or 519. Alternatively, the server may be distributed over a plurality of control stations.

Module 500 can also be communicatively coupled to a database 513 via a network 511 using a communication network interface 507, which may also provide connectivity to one or more of a plurality of control stations (e.g. control stations 515, 517, and 519). In some embodiments, module 500 may fetch instructions from database 513 and/or use database 513 as a storage medium to log operational parameters, measurements, configuration, and/or any other data pertinent to the functions of module 500 and/or to the functions and/or status of luminaire 100.

Communication network interface 507 may include one or more components configured to transmit and receive data via communication network 511, such as one or more modulators, demodulators, multiplexers, de-multiplexers, network communication devices, wireless devices, antennas, modems, and any other type of device configured to enable data communication via any suitable communication network. Furthermore, communication network 511 may be any appropriate network allowing communication between or among one or more computing systems, such as, for example, the Internet, a local area network, a power-line communication network, a telephone network, a wireless network, or a wide area network.

Module 500 can include one or more processors 503, a storage device 509, a programmable device 501, such as a memory, and an input/output (I/O) module 505. In some embodiments, I/O module 505 may include a keyboard or a keypad for input, as well as fan-out terminals that may provide one or more paths for connection to peripheral devices. Furthermore, in some embodiments, in addition to the aforementioned components, I/O module 505 can include a touchscreen interface or the like for input and one or more displays for visual output, such as for example a view screen. In yet other embodiments, I/O module 505 can include a built-in printer equipped with label paper. In these embodiments, I/O module 505 may be used to print on a label a date and time of configuration, as well as bias current level, wattage, SKU number, and any other pertinent information. The label may then may be attached to the luminaire for identification purposes. I/O module 505 may also be configured to print a barcode, a QR code, or any other type of code capable of encoding all or some of the above-noted information.

Processor(s) 503 may include one or more processing devices or cores (not shown). In some embodiments, processors 503 may be a plurality of processors, each having either one or more cores. The one or more processors 503 can be configured for execution of instructions fetched from programmable device 501 or fetched from storage device 509, or for execution of instructions obtained via network 511.

Storage device 509 may include a volatile or non-volatile, magnetic, semiconductor, tape, optical, removable, non-removable, read-only, random-access, or other type of storage device or computer-readable computer medium. Storage device 509 may include programs and/or other information that may be used by processor 503. Furthermore, storage 509 may be configured to log data processed, recorded, or collected during the operation of controller 802. The data may be time-stamped, GPS-tagged, cataloged, indexed, or organized in a variety of ways consistent with data storage practice without departing from the scope of the present disclosure.

The functionality of module 500 is imparted by its structure. Namely, the structure of module 500 is provided by the software or firmware modules (5011, 5012, 5013, . . . , 501n) located in programmable device 501, n being any integer greater than 3). These modules can be thought of as being a plurality of memory sectors of device 501. These modules can be pre-programmed with specific instructions, or they can be programmed via network 511 or via I/O interface 505, or using a combination of some or all of the above-mentioned methods.

For example, one or more of the modules may include instructions, which when executed by processor 503, cause processor 503 to perform operations including monitoring a driver current of a light source of the luminaire and changing a level of the driver current outputted by driver circuit 10. One or more of the modules may include instructions to measure the input power delivered to the luminaire and/or to change a driver current set point, the driver current set point being the current level at which the light sources of the luminaire are biased before reprogramming. In some embodiments, module 500 can perform all the functions that PS element can 4, i.e. the modules may contain instructions for processor 503 to dim or brighten the light being output from the luminaire, as well as instructions for processor 503 to turn on or off one or more light sources of the luminaire.

In some luminaires, referring to FIG. 1A, pod 103 can include transparent windows, and luminaire 100 can include a plurality of cameras disposed therein. These cameras can be mounted on electronically-controlled moveable platforms. These platforms can be moved to provide camera coverage of a specific portion of a roadway. As such, in embodiments of the invention, the modules can include instructions for processor 503 to actuate one or more moveable platforms included within the luminaire.

Further, in some embodiments, the modules can include instructions to cause processor 503 to read information from a storage device or to write information to the storage device, the storage device being included in the luminaire (such as storage device 407 in the luminaire, wherein the connections to socket 107 are not shown for clarity). This information can be a code representative of a serial number, a state of the luminaire (for reading operations only), and location information. The location information may be GPS data indicating the precise location of the luminaire; such information may be obtained using on-board GPS hardware (not shown) included in module 500, or it may be entered manually.

The state of the luminaire can be, without limitation, but by way of example only, the number of hours that the luminaire has been ON since its deployment, a date and time of when maintenance was performed, etc. Further, the modules may comprise instructions for reading/writing a schedule for dimming/brightening or turning on/turning off the luminaire. The on-board electronics of the luminaire may then use the schedules to perform the desired operations at the desired times.

Figure 6:
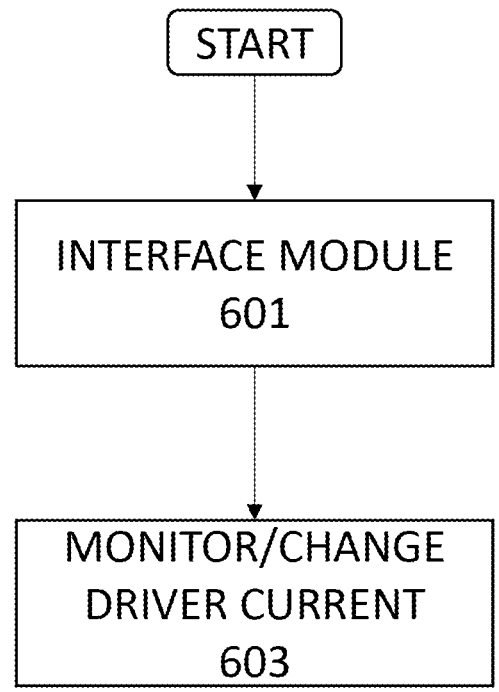
FIG. 6 depicts a flow chart of a method according to an embodiment.

Having set forth the structure of the embodiments of the invention, a method consistent with the use of these embodiments in an industrial setting is provided in FIG. 6, which depicts a flow chart of an exemplary method 600. Module 500 is configured to execute method 600, using the various features described above, either in part or in whole.

Method 600 includes a step 601 of interfacing a programming module (like module 500) with the luminaire via a photo-electric element socket of the luminaire. Method 600 further includes a step 603 of performing at least one of monitoring and changing the driver current using the programming module. Method 600 can include several optional steps that are described below.

Method 600 can include a step for dimming a light output of the light source of the luminaire. Method 600 can include performing one of turning on and turning off a light source of the luminaire. Furthermore, method 600 can include using the programming module to actuate one or more moveable components included within the luminaire. Furthermore, method 600 can include a step of using the programming module for performing one of reading from a storage device and writing to the storage device, the storage device being included in the luminaire. Moreover, method 600 can include reading and/or writing a serial number, a state of the luminaire, and location data to the storage device of the luminaire.

Generally speaking, method 600 can further include reading and/or writing data to the luminaire. Such data can include a schedule for increasing a light output of a light source of the luminaire. Furthermore, generally speaking, method 600 can include using the programming module, sending and/or receiving data to the luminaire.

The above-described embodiments as well as their modifications can be used as late point identification and diagnostics devices to configure, reconfigure, and or generally read and write from a luminaire via the PE socket. In one scenario, a technician may use a module like module 500 in the field by removing the PE element of the luminaire and by replacing with the module. Once the luminaire is programmed, the module can simply be removed and the PE element replaced.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A programming module for use with a luminaire, the programming module comprising:
a connector configured to provide an interface between the programming module and the luminaire via a photo-electric element (PE) socket of the luminaire;
a programmable device including a plurality of separate modules including a memory and configured to: (i) interface with and be pre-programmed by an external communication network, and (ii) receive instructions from the external communication network;
a processor configured to interface with the programmable device that, when executing the instructions from the separate modules, included in the memory, is further configured to perform operations comprising:
measuring and monitoring input power to the luminaire; and
changing a driver current set point based on the monitored input power, wherein a driver current set point being the current level at which the light sources of the luminaire are biased before reprogramming.

2. The programming module of claim 1, further comprising an input/output module, wherein the operations further comprise printing a label using the input/output module.

3. The programming module of claim 1, wherein the operations further comprise one of turning on and turning off a light source of the luminaire.

4. The programming module of claim 1, wherein the programming module is battery-operated.

5. The programming module of claim 1, wherein the operations further comprise one of (i) reading from a storage device and (ii) writing to the storage device, the storage device being included in the luminaire.

6. The programming module of claim 5, wherein reading from the storage device includes reading one of (i) a serial number, (ii) a state of the luminaire, and (iii) location information.

7. The programming module of claim 5, wherein writing to the storage device includes writing one of (i) a serial number, (ii) location data, and (iii) luminaire state data.

8. The programming module of claim 7, wherein the luminaire state data include a schedule for dimming a light source of the luminaire.

9. The programming module of claim 7, wherein the luminaire state data include a schedule for increasing a light output of a light source of the luminaire.

10. The programming module of claim 7, wherein the programming module further includes hardware for wireless communication.

11. A method for programming a driver current for a light source of a luminaire, the method including:
interfacing a programming module including a processor and a programmable device, with the luminaire via a photo-electric element socket of the luminaire;
receiving, at the programmable device, instructions from an external communication network;
executing, at the processor interfacing with the programmable device, the instructions received; and
performing, following the interfacing, based on the instructions received at least one of measuring and monitoring input power to the luminaire and changing the driver current based on the monitored input power, via a plurality of separate modules included within the programmable device, wherein a driver current set point being the current level at which the light sources of the luminaire are biased before reprogramming.

12. The method of claim 11, further comprising, using the programming module, dimming a light output of the light source.

13. The method of claim 11, further comprising, using the programming module, performing one of (i) turning on and (ii) turning off a light source of the luminaire.

14. The method of claim 11, further comprising, using the programming module, actuating one or more moveable components included within the luminaire.

15. The method of claim 11, further comprising, using the programming module, performing one of (i) reading from a storage device and (ii) writing to the storage device, the storage device being included in the luminaire.

16. The method of claim 15, wherein reading from the storage device includes reading one of (i) a serial number, (ii) a state of the luminaire, and (iii) location data.

17. The method of claim 15, wherein writing to the storage device includes writing one of (i) a serial number, (ii) location data, and (iii) luminaire state data.

18. The method of claim 17, wherein the luminaire state data include a schedule for dimming a light source of the luminaire.

19. The method of claim 17, wherein the luminaire state data include a schedule for increasing a light output of a light source of the luminaire.

20. The method claim 17, further comprising, using the programming module, sending and/or receiving data to the luminaire.

\* \* \* \* \*